United States Patent Office 3,088,985
Patented May 7, 1963

3,088,985
NEW OPEN-CHAIN TRIMER AND THE PRODUCTION THEREOF
Günther Wilke, Mulheim (Ruhr), Germany, assignor to Studiengesellschaft Kohle m.b.H., Mulheim (Ruhr), Germany, a corporation of Germany
No Drawing. Filed Aug. 28, 1958, Ser. No. 757,703
Claims priority, application Austria Sept. 2, 1957
6 Claims. (Cl. 260—677)

This invention relates to a new open-chain trimer and the production thereof.

Belgian patent specifications No. 555,180 and 564,175 describe processes by means of which diolefines, such as butadiene, isoprene and piperylene, can be converted with the aid of organo-metallic mixed catalysts into cyclic hydrocarbons with at least 8 carbon atoms, i.e. into cyclododecatri-(1,5,9)-enes. The cyclic compounds serve as important initial products for obtaining bifunctional derivatives of n-dodecane, for example dodecane-1,12-diacid, and of 12-aminododecanic acid lactam.

In the course of further investigations, it has now surprisingly been found that an analogous treatment of the 2,3-dimethyl-butadi-1,3-ene with the organometallic mixed catalysts does not yield a cyclic trimerisate, but rather an open-chain trimer is formed in high yields.

The trimer, which is a new compound provided by the invention, corresponds to the empirical formula $C_{18}H_{30}$ and has a boiling point of 130° C. at 5 mm. pressure and a refractive index $n_D^{20}=1.4973$. During catalytic hydrogenation of this trimer under pressure, the quantity of hydrogen equivalent to four double bonds is taken up, which proves the open-chain structure. The open-chain constitution is also confirmed by the infra-red spectrum. A thick band occurs at 890 cm.$^{-1}$ in the spectrum and this is to be correlated to the branched double bond in the end position.

This trimerisation is obviously a completely new type of reaction of conjugated diolefines with organometallic mixed catalysts, for it can be shown that the trimeric dimethyl butadiene cannot be formed by the usual 1,2-addition or 1,4-addition of three molecules of the monomer, since the reaction product not only has two branched double bonds in the end position but also has two double bonds in the middle position, these being in fact conjugated.

The presence of a pair of conjugated double bonds can in the first place be proved in the infra-rad spectrum; in the second place, it is possible without any difficulty to add one molecule of maleic acid anhydride according to Diels-Alder, the addition product corresponding to the empirical formula $C_{22}H_{32}O_3$.

The trimeric dimethyl butadiene can have the following constitutional formula:

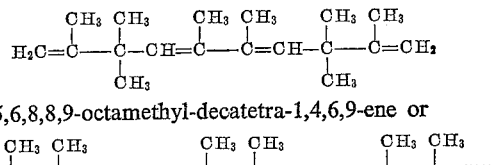

2,3,3,5,6,8,8,9-octamethyl-decatetra-1,4,6,9-ene or

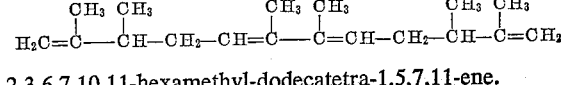

2,3,6,7,10,11-hexamethyl-dodecatetra-1,5,7,11-ene.

Compounds which have proved particularly suitable as catalysts for the trimerisation of dimethyl butadiene are mixtures comprising one or more halides of titanium, primarily titanium tetrachloride, and/or halides or oxyhalides of chromium, primarily chromyl chloride, and one or more aluminium trialkyls, dialkyl aluminium hydrides and/or alkyl aluminium halides. The molar ratios of Ti:Al=1:3 to 5 and Cr:Al=1:3 to 5 are preferred for this purpose.

It is advantageous to work in an inert solvent, such as an aliphatic or aromatic or halogenated hydrocarbon: the preferred solvent is benzene.

Temperatures from 0–100° C., but preferably between 20 and 50° C., can be used as reaction temperature.

The yields of trimers are 70–90%.

The trimeric dimethyl butadiene serves as a valuable starting product for organic syntheses, but especially for the preparation of strongly methyl-branched α,ω-bifunctional compounds, which are important for the production of plastics, such as polyesters and polyamides.

The following example further illustrates the invention.

*Example*

4.8 cc. (0.059 mol) of chromyl chloride are dissolved in 1 litre of absolute benzene. While stirring, 33 cc. (0.24 mol) of aluminium triethyl are slowly added dropwise to this solution, the mixture being heated and a precipitate being formed. Stirring is continued for another half an hour, the mixture is heated to 50° C. and then 323 g. of dimethyl butadiene are added dropwise over a period of 1 hour. The mixture is stirred vigorously for 24 hours at 50° C. The mixture is then decomposed with a quantity of methanol equivalent to the aluminium and dilute sulphuric acid. The organic layer is washed with water and dried with $CaCl_2$. By distillation, there are obtained 220 g. of the trimer, which distills over at $B.P._{5mm.}=130°$ C.; $n_D^{20}=1.4973$. The yield is 82%, based on reacted dimethyl butadiene. The distillation residue consists for the most part of a tetramer of dimethyl butadiene.

What I claim is:

1. Process for the trimerization of 2,3-dimethyl-butadi-1,3-ene to form an open-chain trimer, which comprises contacting 2,3-dimethyl-butadi-1,3-ene under polymerization conditions including a temperature of from 0 to 100° C. with a catalyst comprising a mixture of at least one member selected from the group consisting of chlorides and oxychlorides of chromium with at least one member selected from the group consisting of aluminum trialkyls, dialkyl aluminum hydrides and alkyl aluminum chlorides, the molar ratio of chromium aluminum in said catalyst mixture being from 1:3 to 5, and recovering the open-chain trimer, of 2,3-dimethyl-butadi-1,3-ene.

2. Process according to claim 1, wherein said contacting is carried out in the process of an inert solvent.

3. Process according to claim 2, wherein said solvent is a member selected from the group consisting of aliphatic, aromatic, and halogenated hydrocarbons and mixtures thereof.

4. Process according to claim 3, wherein said solvent is benzene.

5. Process for the trimerization of 2,3-dimethyl-butadi-1,3-ene to form an open-chain trimer, which comprises contacting 2,3-dimethyl-butadi-1,3-ene under polymerization conditions including a temperature of 50° C. with a catalyst comprising a mixture of chromyl chloride and aluminum triethyl, the molar ratio of chromium to aluminum in said catalyst mixture being from 1:3 to 5, and recovering the open-chain trimer of 2,3-dimethyl-butadi-1,3-ene thereby produced.

6. An open-chain trimer having the empirical formula $C_{18}H_{30}$, B.P. $_{5mm.}=130°$ C.; $n_D^{20}=1.4973$, and exhibiting a band at 890 cm.$^{-1}$ in the infrared spectrum prepared by contacting 2,3-dimethyl-butadi-1,3-ene under polymerization conditions including a temperature of from 0 to 100° C. with a catalyst comprising a mixture of at least one member selected from the group consisting of chlorides and oxychlorides of chromium, and at least one member selected from the group consisting of aluminum trialkyls, dialkyl aluminum hydrides and alkyl aluminum chlorides, the molar ratio of chromium to aluminum in said catalyst mixture being from 1:3 to 5.

References Cited in the file of this patent

UNITED STATES PATENTS

| | | |
|---|---|---|
| 2,824,089 | Peters et al. | Feb. 18, 1958 |
| 2,832,759 | Nowlin et al. | Apr. 29, 1958 |
| 2,846,427 | Findlay | Aug. 15, 1958 |

FOREIGN PATENTS

| | | |
|---|---|---|
| 543,292 | Belgium | June 2, 1956 |

OTHER REFERENCES

Farmer et al.: "Jour. Chem. Soc.," 1938, pp. 287–91.

Beilstein: "Handbuch der organischen Chemie," vol. I, 2nd sup., p. 249 (1941).